(12) United States Patent
Sakai

(10) Patent No.: US 10,938,645 B2
(45) Date of Patent: Mar. 2, 2021

(54) COMMUNICATION APPARATUS AND CONTROL METHOD TO CREATE WIRELESS NETWORK TO COMMUNICATE WITH ANOTHER COMMUNICATION APPARATUS

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 16/365,046

(22) Filed: Mar. 26, 2019

(65) Prior Publication Data

US 2019/0306019 A1 Oct. 3, 2019

(30) Foreign Application Priority Data

Apr. 2, 2018 (JP) .............................. JP2018-070891

(51) Int. Cl.
*H04L 12/24* (2006.01)
*H04W 76/10* (2018.01)
*H04W 84/12* (2009.01)

(52) U.S. Cl.
CPC ......... *H04L 41/0806* (2013.01); *H04W 76/10* (2018.02); *H04W 84/12* (2013.01)

(58) Field of Classification Search
CPC .. H04L 41/0806; H04W 76/10; H04W 84/12; H04W 4/08
See application file for complete search history.

(56) References Cited

U.S. PATENT DOCUMENTS

| | | | | |
|---|---|---|---|---|
| 2007/0208937 A1* | 9/2007 | Cam-Winget | ........ | H04L 9/0844 713/168 |
| 2009/0132682 A1* | 5/2009 | Counterman | ....... | H04L 41/0886 709/220 |
| 2010/0177711 A1* | 7/2010 | Gum | ..................... | H04W 88/06 370/329 |
| 2014/0185549 A1* | 7/2014 | Watanabe | ............. | H04W 48/16 370/329 |
| 2015/0092555 A1* | 4/2015 | Tam | ..................... | H04W 88/08 370/235 |
| 2017/0295448 A1 | 10/2017 | McCann | | |

\* cited by examiner

*Primary Examiner* — Walli Z Butt
(74) *Attorney, Agent, or Firm* — Canon U.S.A., Inc., IP Division

(57) ABSTRACT

A communication apparatus communicates with another communication apparatus that can operate as a creating apparatus creating a wireless network or as a participating apparatus participating in a wireless network created by a creating apparatus, and determines, when the another communication apparatus operates as the creating apparatus, whether a number of connectable apparatuses is greater than or equal to a predetermined value. When the number of connectable apparatuses is greater than or equal to the predetermined value, the communication apparatus provides the another communication apparatus with communication parameters to be used for operating as the creating apparatus. When the number of connectable apparatuses is less than the predetermined value, the communication apparatus provides the another communication apparatus with communication parameters to be used for operating as the participating apparatus.

13 Claims, 6 Drawing Sheets

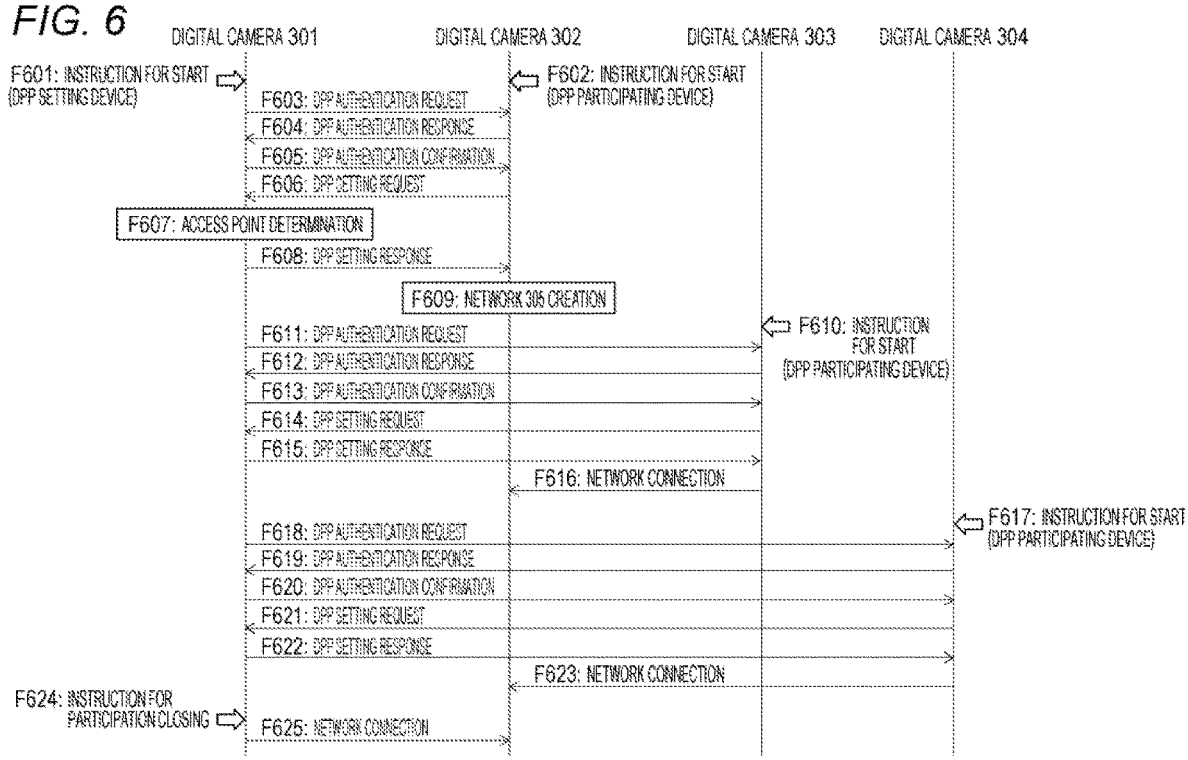

COMMUNICATION APPARATUS AND CONTROL METHOD TO CREATE WIRELESS NETWORK TO COMMUNICATE WITH ANOTHER COMMUNICATION APPARATUS

BACKGROUND

Field

The present disclosure relates to a communication apparatus and a control method of the communication apparatus.

Description of the Related Art

There is a use case that is realized by forming a wireless LAN network among a plurality of devices and interlocking the plurality of devices via wireless LAN communication. For example, a wireless LAN network is formed among a plurality of cameras and the cameras perform interlocked shooting. In this example, the user can specify any one of the cameras as a master device and release the other cameras wirelessly in conjunction with an operation of clicking (releasing) the shutter of the master device.

U.S. Patent Application Publication No. 2017/0295448 discusses a network forming scheme called Device Provisioning Protocol (hereinafter referred to as "DPP"), which has been used in recent years. By using the DPP, one of devices forming a wireless LAN network becomes a configurator (DPP setting device), and the other devices become enrollees (DPP participating devices). Then, the DPP setting device and the DPP participating devices share wireless parameters. These devices can easily and securely form a wireless LAN network based on the shared wireless parameters.

In the above example, the master device can operate as a wireless LAN access point, the other devices as wireless LAN terminals, and the other devices can be connected to the master device to form a wireless LAN network. Using the DPP enables easy and secure formation of a wireless LAN network among these devices. However, when each of the devices becomes a wireless LAN access point, the number of connectable wireless LAN terminals (hereinafter referred to as "maximum connectable device number") can be different depending on the performance of the wireless LAN chip mounted in that device. In this case, if the device smaller in the maximum connectable device number among the devices forming the wireless LAN network is used as the wireless LAN access point, the usability of the network can decrease.

It is assumed, for example, that a network for interlocked shooting is formed among six cameras with the maximum connectable device number of ten and one camera with the maximum connectable device number of five, total seven cameras. In this case, when the camera with the maximum connectable device number of five becomes the wireless LAN access point, one of the other six cameras cannot connect to the network. Accordingly, interlocked shooting cannot be performed among the desired cameras, and the usability of the network is reduced.

SUMMARY OF THE INVENTION

According to an aspect of the present disclosure, a communication apparatus operates an appropriate device as a parent station of a wireless network to form a wireless network by a plurality of devices.

A communication apparatus according to an aspect of the present disclosure includes a communication unit that communicates with another communication apparatus operable as a creating apparatus that creates a wireless network or as a participating apparatus that participates in a wireless network created by a creating apparatus, a determination unit configured to, when the another communication apparatus operates as the creating apparatus, determine whether a number of connectable apparatuses is greater than or equal to a predetermined value, and a provision unit configured to, when the determination unit determines that the number of connectable apparatuses is greater than or equal to the predetermined value, provide the another communication apparatus with a communication parameter to be used for operating as the creating apparatus and when the determination unit determines that the number of connectable apparatuses is less than the predetermined value, provide the another communication apparatus with a communication parameter to be used for operating as the participating apparatus.

Further features will become apparent from the following description of exemplary embodiments with reference to the attached drawings.

BRIEF DESCRIPTION OF THE DRAWINGS

FIG. 6 is a diagram of operation sequences among digital cameras in the embodiment.

DESCRIPTION OF THE EMBODIMENTS

Hereinafter, a communication apparatus according to an embodiment of the present disclosure will be described in detail with reference to the drawings. The following embodiment is not intended to be limiting. All the combinations of characteristics described in relation to the embodiment are not necessarily essential to the solution of the present disclosure. The configuration of the embodiment can be appropriately modified or changed depending on the specifications of the apparatus to which the present disclosure is applied and various conditions (usage conditions, usage environment, etc.). The technical scope of the present disclosure is determined by the claims and is not limited by the following individual embodiment. In the following embodiment, an imaging apparatus (digital camera) having a communication function will be described as an example of a communication apparatus.

(Configuration of Digital Camera)

Figure 1:
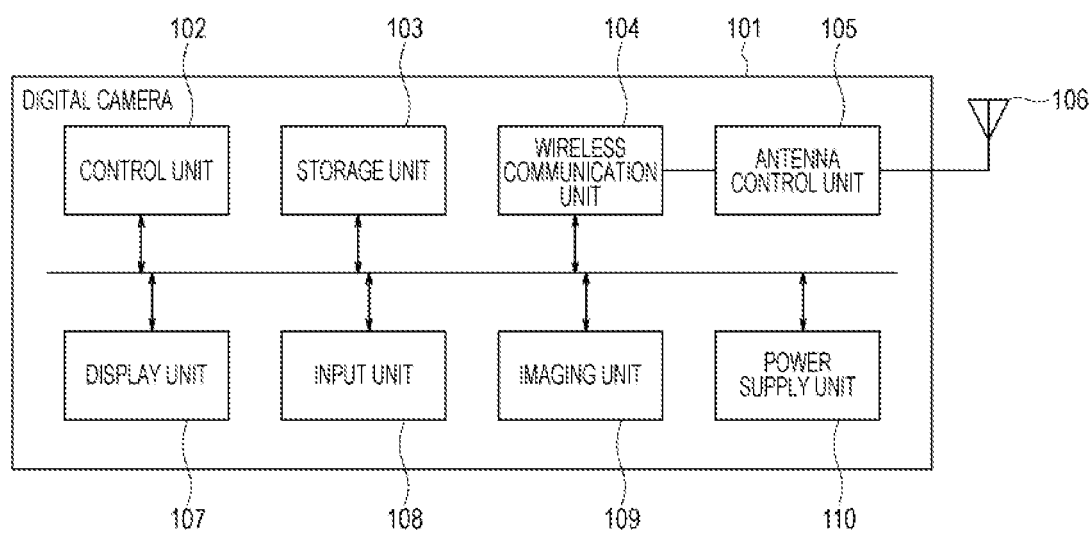
FIG. 1 is a hardware block diagram of a communication apparatus according to an embodiment.

FIG. 1 is a block diagram illustrating a hardware configuration of a digital camera 101 according to the present embodiment. At formation of a network, the digital camera 101 can operate as an access point or as a terminal apparatus. The digital camera 101 includes a control unit 102, a storage unit 103, a wireless communication unit 104, an antenna control unit 105, an antenna 106, a display unit 107, an input unit 108, an imaging unit 109, and a power supply unit 110. The access point in the present embodiment is an example of a parent station in a wireless network, and the terminal apparatus is an example of a child station in a wireless network. The parent station in a wireless network can be any apparatus having the function of creating the wireless network, and is not limited to an access point in the wireless LAN. Similarly, a child station in a wireless network can be any apparatus having the function of participating in the wireless network created by the parent station, and is not limited to a terminal apparatus in the wireless LAN.

The control unit 102 consists of, for example, one or more CPUs and MPUs and controls the operations of the units 103 to 110 of the digital camera 101. The control unit 102 controls the digital camera 101 by executing control programs stored in the storage unit 103. The control unit 102 also performs setting control of communication parameters with other communication apparatuses.

The storage unit 103 consists of an HDD, a ROM, a RAM, an IC memory card, or the like, and stores the control programs executed by the control unit 102 and various kinds of information such as communication parameters (including wireless LAN parameters used for network formation). Various operations described below are performed by the control unit 102 executing the control programs stored in the storage unit 103. The storage unit 103 also stores data transmission/reception information, image data, and the like. The storage unit 103 also stores application programs and an operating system.

The wireless communication unit 104 performs wireless communication over a wireless LAN conforming to the IEEE 802.11 standard or the like. Wireless communication includes short-range wireless communication, for example, Bluetooth® and Near Field Communication (NFC).

In the present embodiment, the antenna control unit 105 is a wireless LAN antenna control unit. The antenna 106 is a wireless LAN antenna used for wireless LAN communication.

The display unit 107 includes a liquid crystal display (LCD) and a light emitting diode (LED), and displays various data, numerical values, characters, images, and the like. The display unit 107 has a function of outputting visually perceptible images or the like (hereinafter referred to as "visual information"). In addition, the display unit 107 can have a speaker and the like to perform a function of outputting sound, or can have a light emitting unit to perform a function of outputting light. The display unit 107 may not have the function of outputting visual information, but may have only the function of outputting sound (or light).

The input unit 108 includes buttons, switches, touch panels, etc., and the user performs various inputs and the like via the input unit 108. The user uses the input unit 108 to operate the digital camera 101. For example, the user can operate the input unit 108 to activate the digital camera 101 as a DPP setting device. In addition, the user can operate the input unit 108 to input a participation closing instruction (described below) to the digital camera 101. The input unit 108 can also be referred to as an operation unit.

The imaging unit 109 is formed from an imaging element, a lens, and the like, and captures still images (photographs) and moving images.

The power supply unit 110 is, for example, a battery that stores power for operating the entire digital camera 101 and supplies the power to each hardware.

The digital camera 101 has at least the configuration illustrated in FIG. 1, and can have other hardware elements and functional units. In addition, the configuration of the components illustrated in FIG. 1 is an example, and a plurality of parts can constitute one part, or one part can be divided into parts performing a plurality of functions.

Some or all of the control unit 102, the wireless communication unit 104 and the antenna control unit 105 illustrated in FIG. 1 can be implemented by software or hardware. For example, when the wireless communication unit 104 is implemented by software, a program for providing the function of the wireless communication unit 104 is stored in a memory such as a ROM. The stored program is appropriately read into the RAM and executed by the CPU constituting the control unit 102 to implement the function of the wireless communication unit 104. When the wireless communication unit 104 is implemented by hardware, for example, a predetermined compiler can be used to automatically create a dedicated circuit on an FPGA (Field Programmable Gate Array) from a program for implementing the function of each functional module. A gate array circuit can be formed in the same manner as the FPGA to implement the wireless communication unit 104 as hardware. The wireless communication unit 104 can be implemented by an application specific integrated circuit (ASIC).

(Software Functional Configuration Related to Communication Control)

Figure 2:
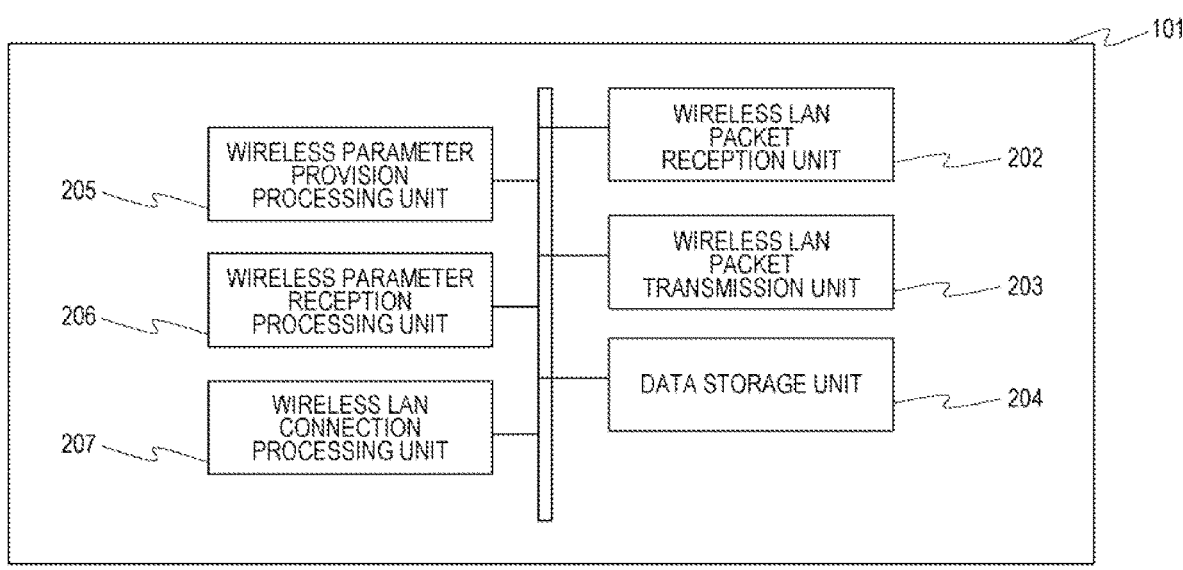
FIG. 2 is a software functional block diagram of the communication apparatus according to the embodiment.

FIG. 2 is a block diagram illustrating software function for executing a communication control function described below, out of the software functions of the digital camera 101.

The digital camera 101 includes a wireless LAN packet reception unit 202, a wireless LAN packet transmission unit 203, a data storage unit 204, a wireless parameter provision processing unit 205, a wireless parameter reception processing unit 206, and a wireless LAN connection processing unit 207.

The wireless LAN packet reception unit 202 and the wireless LAN packet transmission unit 203 carry out wireless LAN communication with other devices (other communication apparatuses) in conformity with the IEEE 802.11 standard.

The data storage unit 204 stores data and information on software, wireless LAN parameters, authentication information, the number of connected devices (described below), and the like in the storage unit 103. The information (for example, the number of connected devices) stored in the storage unit 103 can be displayed on the display unit 107. The wireless LAN parameters are hereinafter referred to as "wireless parameters".

The wireless parameter provision processing unit 205 carries out processing as a DPP setting device and performs processing for providing other devices with wireless parameters necessary for creating a wireless LAN network and connection. The wireless parameters include information such as a network name (Service Set Identifier (SSID)), an encryption method, an encryption key, and the like.

In the present embodiment, the wireless parameter provision processing unit 205 transmits information indicating the role of each device in the wireless LAN network. That is, information indicating whether each device is a wireless LAN access point or a wireless LAN terminal.

The wireless parameter provision processing (FIG. 5) described below is executed by the wireless parameter provision processing unit 205.

The wireless parameter reception processing unit 206 receives the wireless parameters necessary for creating a wireless LAN network and making a connection provided from the DPP setting device and the information indicating the role of each device, and stores the same in the storage unit 103 (FIG. 1).

The wireless LAN connection processing unit 207 performs creating processing of a wireless LAN network or connection processing to a wireless LAN network based on the wireless parameters stored in the storage unit 103.

(Configuration of a Wireless LAN Network)

Figure 3:
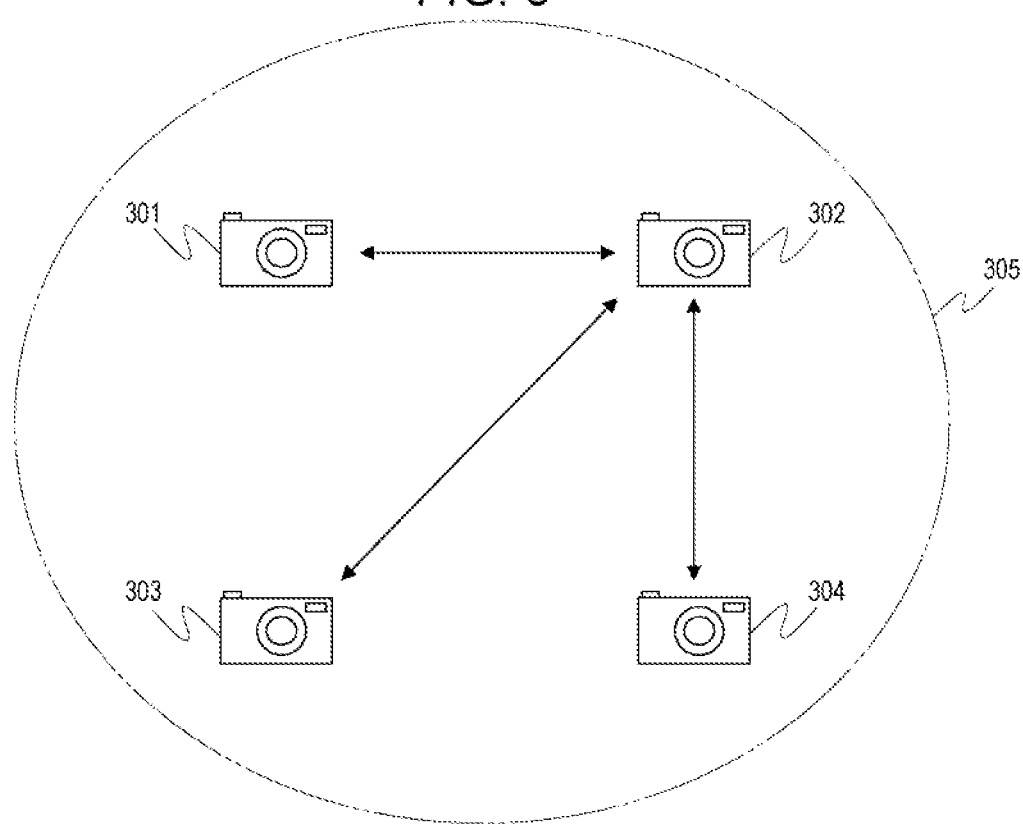
FIG. 3 is a diagram illustrating an example of a network configuration to which the embodiment is applied.

FIG. 3 illustrates digital cameras 301, 302, 303, 304 and a wireless LAN network 305. The wireless LAN network 305 is a network created and managed by the digital camera 302. From the viewpoint of the digital camera 301, the digital camera 301 forms the wireless LAN network 305 together with the digital cameras 302 to 304 as a plurality of other communication apparatuses.

In the present embodiment, the digital cameras 301, 302, 303, and 304 are configured as illustrated in FIGS. 1 and 2, and form the wireless LAN network 305 using DPP.

In the present embodiment, the maximum connectable device number of the digital camera 301 (the maximum connectable apparatus number) is one, and the maximum connectable device number of the digital cameras 302, 303, and 304 is three. In each of the digital cameras, the information on the maximum connectable device number of the subject apparatus is stored in the storage unit 103. In the present embodiment, the four digital cameras 301 to 304 form a network that can operate in an interlocked manner (interlocked shooting).

In the present embodiment, the maximum participating device number of the wireless LAN network 305 is four, and information on the maximum participating device number is stored in advance in the storage unit 103 of each digital camera. The maximum participating device number is determined, for example, by the service implemented in the wireless LAN network 305. That is, the maximum participating device number is determined based on the application in the digital camera. Alternatively, the maximum participating device number can be determined by information input from the user via the input unit 108. In the present embodiment, since the four digital cameras 301 to 304 form a network that can operate in an interlocked state, the maximum participating device number is four. The maximum participating device number is the maximum number of apparatuses that can participate in the network 305 under predetermined conditions.

The digital camera 301 is activated as a DPP setting device by a user's operation, determines the digital camera 302 as a wireless LAN access point by wireless parameter provision processing described below, and distributes wireless parameters to the other digital cameras. The digital camera 302 also creates the wireless LAN network 305 based on the received wireless parameters, and the other digital cameras 301, 303, and 304 participate in the created wireless LAN network 305.

The wireless parameters distributed by the digital camera 301 can be generated by the digital camera 301 when forming the wireless LAN network 305 or can be stored in advance in the storage unit 103.

(Wireless LAN Network Formation Processing)

Figure 4:
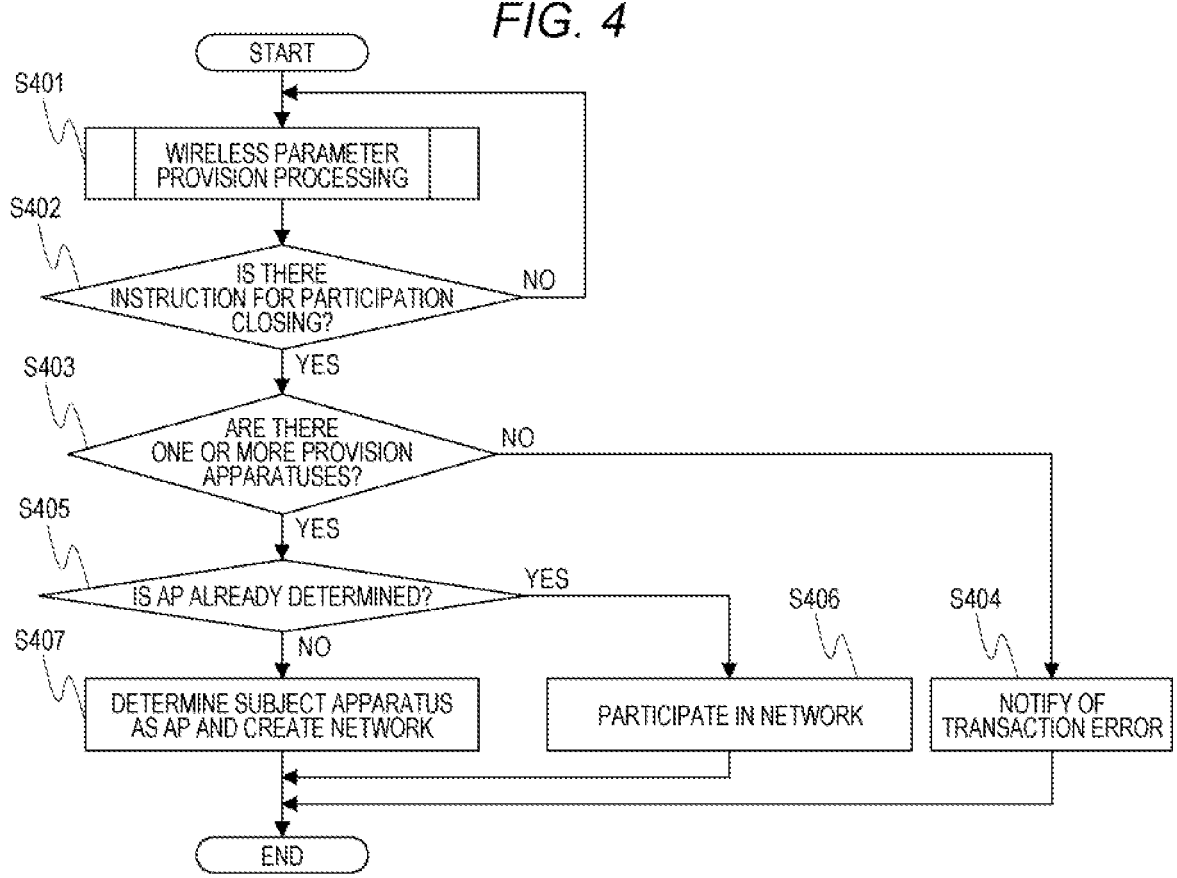
FIG. 4 is a flowchart of wireless LAN network formation processing in the embodiment.

FIG. 4 illustrates a flowchart of wireless LAN network formation processing performed in the digital camera 301 of the present embodiment. The processing in the flowchart of FIG. 4 is started by the wireless parameter provision processing unit 205 when the digital camera 301 is activated as a DPP setting device by a user operation. The processing in the flowchart of FIG. 4 is performed by the control unit 102 reading and executing the computer program stored in the storage unit 103.

In step S401, the digital camera 301 performs the wireless parameter provision processing and provides wireless parameters to the DPP participating devices (the digital cameras 302 to 304). The wireless parameter provision processing will be described below with reference to FIG. 5.

In step S402, the digital camera 301 determines whether a participation closing instruction by a user operation has been received. The user looks at the number of the parameter provision device (S508 in FIG. 5) displayed on the display unit 107 of the digital camera 301, for example, and inputs a participation closing instruction when the displayed number of the parameter provision device is three. If the digital camera 301 has not received a participation closing instruction, the process returns to S401 to provide wireless parameters to the DPP participating devices (the digital cameras 302 to 304).

When the digital camera 301 receives a participation closing instruction (S402: Yes), the process proceeds to S403.

In step S403, the digital camera 301 determines whether the wireless parameters have been provided to one or more DPP participating devices (digital cameras) during the time from its activation as a DPP setting device to the reception of the participation closing instruction.

If the digital camera 301 has not provided the wireless parameters to any of the DPP participating devices (S403: No), the process proceeds to S404.

In step S404, the digital camera 301 notifies the user of transaction error that the network formation is impossible, and terminates the processing. The notification to the user is made by, for example, displaying an error message on the display unit 107.

When the digital camera 301 has provided the wireless parameters to one or more DPP participating devices (S403: Yes), the process proceeds to S405.

In step S405, the digital camera 301 determines whether the digital camera to be a wireless LAN access point has been determined in the wireless parameter provision processing. The access point is described as "AP" in FIG. 4.

When the digital camera to be the wireless LAN access point has been determined (S405: Yes), the process proceeds to S406.

In step S406, the digital camera 301 participates in the wireless LAN network 305 created by another device (the digital camera 302 in the present embodiment) based on the distributed wireless parameters.

If the digital camera to be the wireless LAN access point has not been determined (S405: No), the process proceeds to S407.

In step S407, the digital camera 301 is activated as an access point and creates the wireless LAN network 305 based on the distributed wireless parameters.

When it is determined in S407 that the number of devices provided with the wireless parameters is greater than the maximum connectable device number of the subject apparatus, the digital camera 301 can terminate the processing for the reason that no desired network can be formed. In addition, in S407, when the number of devices provided with the wireless parameters is greater than the maximum connectable device number of the subject apparatus, the digital camera 301 can notify the user that no desired network can be formed. In this case, for example, the wireless parameter provision processing unit 205 outputs one or more of error information or warning information to the display unit 107, and the display unit 107 outputs the error information and/or warning information by characters, images, light, sound, etc.

(Wireless Parameter Provision Processing)

Figure 5:
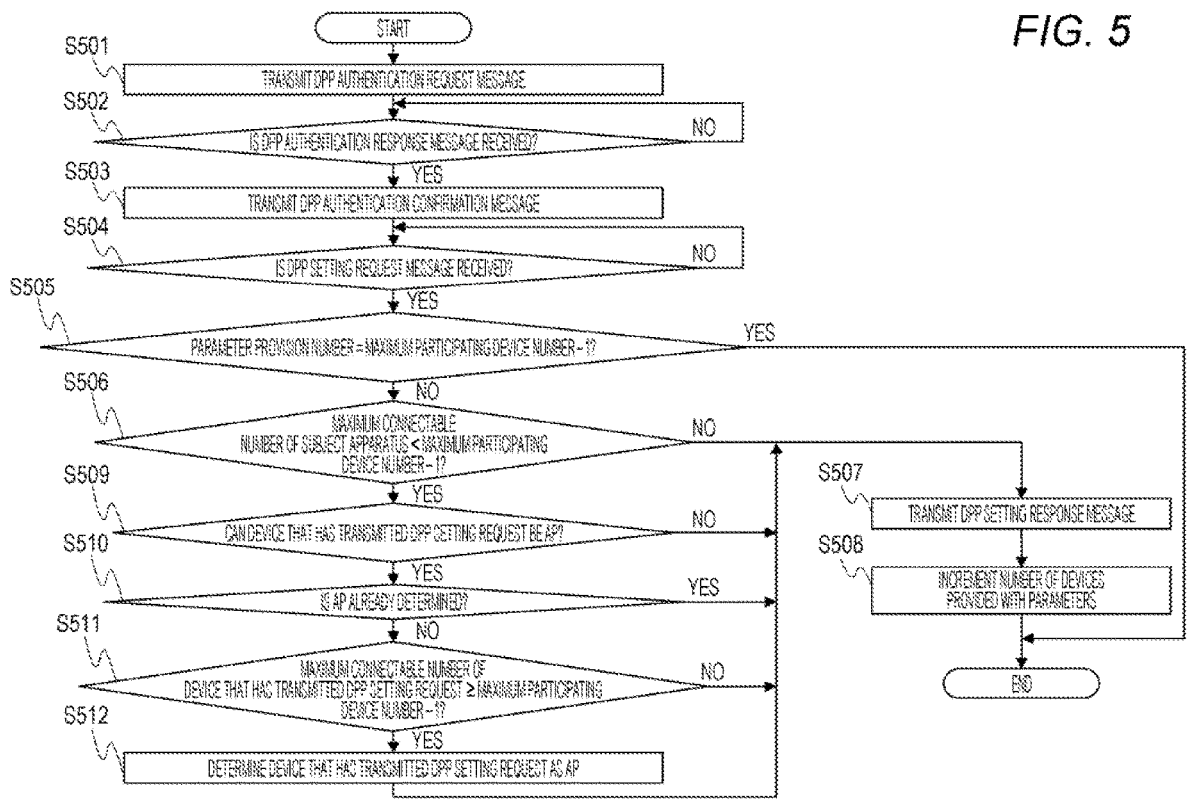
FIG. 5 is a flowchart of wireless parameter provision processing in the embodiment.

FIG. 5 is a flowchart illustrating details of S401 (wireless parameter provision processing) described in FIG. 4.

In step S501, the digital camera 301 broadcasts a message for performing DPP authentication (DPP authentication request message). The digital camera 301 can transmit the authentication request message via unicast or multicast to the digital cameras previously registered in the storage unit 103.

After transmission of the DPP authentication request message, the digital camera 301 waits for a DPP authentication response message from the DPP participating devices. That is, in step S502, the digital camera 301 determines whether the DPP authentication response message has been received from the DPP participating devices. When the digital camera 301 has received the DPP authentication response message, the process proceeds to S503.

In step S503, the digital camera 301 performs authentication processing based on the DPP authentication response message, and transmits a DPP authentication confirmation message to the transmitters of the DPP authentication response message. If the authentication processing based on the DPP authentication response message fails, the digital camera 301 can include the error information in the DPP authentication confirmation message and transmit the DPP authentication confirmation message to the transmitter of the DPP authentication response message.

After transmission of the DPP authentication confirmation message, the digital camera 301 waits for a DPP setting request message from the DPP participating devices that have undergone the authentication processing. That is, in step S504, the digital camera 301 determines whether a DPP setting request message has been received from the DPP participating devices. If the DPP setting request message is not received, the digital camera 301 repeats S504. When the DPP setting request message is received, the digital camera 301 proceeds the process to S505.

In step S505, the digital camera 301 determines whether the number of the devices provided with the wireless parameters has reached a value obtained by excluding the digital camera itself from the maximum participating device number of the network 305. That is, the digital camera 301 determines whether the number of the devices provided with the wireless parameters is the maximum participating device number−1. In the present embodiment, the maximum participating device numbers is four, thus the value excluding the digital camera itself is three. The number of the devices provided with the wireless parameters by the digital camera 301 is displayed on the display unit 107. When the result of the determination in S505 is Yes, the digital camera 301 terminates the wireless parameter provision processing. When the result of the determination in S505 is No, the process proceeds to S506.

In step S506, the digital camera 301 determines whether the maximum connectable device number of the digital camera itself is less than a value obtained by excluding the wireless LAN access point from the maximum participating device number. That is, the digital camera 301 determines whether the maximum connectable device number of the digital camera 301 is less than the maximum participating device number−1. In the present embodiment, the maximum connectable device number of the digital camera 301 is one, and the value obtained by excluding the wireless LAN access point from the maximum participating device number is three. The value of the maximum participating device number−1 is a value determined based on the number of devices that can participate in the network 305 under predetermined conditions. When the result of the determination in S506 is Yes, the process proceeds to S509. When the result of the determination in S506 is No, the process proceeds to S507.

In step S507, the digital camera 301 transmits a DPP setting response message including the wireless parameters to the DPP participating devices. After the transmission of the DPP setting response message, the digital camera 301 increments the number of devices provided with the wireless parameters and terminates the processing (S508).

In step S509, the digital camera 301 determines whether the device that has transmitted the DPP setting request message can operate as a wireless LAN access point. Whether the device that has transmitted the DPP setting request message can operate as a wireless LAN access point can be determined based on the information in the DPP setting request message. When the result of the determination in S509 is Yes, the process proceeds to S510.

When the result of the determination in S509 is No, the process proceeds to S507. That is, when the device that has transmitted the DPP setting request message cannot operate as a wireless LAN access point, the digital camera 301 transmits a DPP setting response message including the wireless parameters to the DPP participating devices (S507). Then, the digital camera 301 increments the number of devices provided with the wireless parameters and terminates the processing (S508).

In step S510, the digital camera 301 determines whether the device to be a wireless LAN access point has been determined. When the result of the determination in S510 is No, the process proceeds to S511. When the result of the determination in S510 is Yes, the process proceeds to S507.

In step S511, the digital camera 301 checks the maximum connectable device number of the DPP participating device that has transmitted the DPP setting request message. That is, the digital camera 301 determines whether the maximum connectable device number of the DPP participating device that has transmitted the DPP setting request message is greater than or equal to the maximum participating device number excluding the wireless LAN access point. The information on the maximum connectable device number of the DPP participating device that has transmitted the DPP setting request message is included in the DPP setting request message received by the digital camera 301. When the result of the determination in S511 is No, the process proceeds to S507. When the result of the determination in S511 is Yes, the process proceeds to S512.

In step S512, the digital camera 301 determines the DPP participating device that has transmitted the DPP setting request message as a wireless LAN access point.

After S512, the process proceeds to S507, where the digital camera 301 transmits a DPP setting response message including the wireless parameters to the DPP participating device. These wireless parameters include information to instruct for becoming a wireless LAN access point. Then, the digital camera 301 increments the number of devices provided with the wireless parameters and terminates the processing (S508).

Upon completion of the processing in the flowchart of FIG. 5, the process proceeds to S402 described in FIG. 4. However, since there is no participation closing instruction (S402: No) until it is determined that the number of provision devices becomes three in S505 described in FIG. 5, the processing in the flowchart of FIG. 5 is performed on the digital cameras 302 to 304. In the present embodiment, the digital camera 301 executes the processing in the flowchart of FIG. 5 on the digital cameras 302 to 304 to form the network in which the digital camera 302 serves as an access point and the digital cameras 301, 303, and 304 as terminals.

(DPP Processing Performed Among Digital Cameras)

FIG. 6 illustrates a sequence of DPP processing operations performed among the digital cameras 301, 302, 303, and 304.

The digital camera 301 is activated as a DPP setting device by a user operation (F601), and starts the wireless LAN network formation processing described in FIG. 4.

The digital camera 302 is activated as a DPP participating device by a user operation (F602).

The digital camera 301 executes wireless parameter setting processing by DPP with the digital camera 302 (F603 to F608). Specifically, in F603, the digital camera 301 sends a DPP authentication request message to the digital camera 302, and in step F604, the digital camera 302 sends a DPP authentication response message to the digital camera 301. In F605, the digital camera 301 sends a DPP authentication confirmation message to the digital camera 302, and in step F606, the digital camera 302 sends a DPP setting request message to the digital camera 301. Thereafter, the digital camera 301 executes the wireless parameter provision processing described in FIG. 5 and determines the digital camera 302 as a wireless LAN access point (F607, S512 described in FIG. 5). Then, in F608, the digital camera 301 sends a DPP setting response message to the digital camera 302.

In F609, the digital camera 302 creates the network 305 as an access point based on the wireless parameters included in the received DPP setting response message.

In F610, the digital camera 303 is activated as a DPP participating device by a user operation.

The digital camera 301 executes wireless parameter setting processing by DPP with the digital camera 303 (F611 to F615). Specifically, in F611, the digital camera 301 sends a DPP authentication request message to the digital camera 303, and in F612 the digital camera 303 sends a DPP authentication response message to the digital camera 301. In F613, the digital camera 301 sends a DPP authentication confirmation message to the digital camera 303, and in F614, the digital camera 303 sends a DPP setting request message to the digital camera 301. Then, in F615, the digital camera 301 sends a DPP setting response message to the digital camera 303 (Yes in S510 described in FIG. 5, and the process proceeds to S507).

In F616, the digital camera 303 connects to the network 305 created by the digital camera 302 based on the wireless parameters included in the received DPP setting response message.

In F617, the digital camera 304 is activated as a DPP participating device by a user operation.

The digital camera 301 executes wireless parameter setting processing by DPP with the digital camera 304 (F618 to F622). Specifically, in F618, the digital camera 301 sends a DPP authentication request message to the digital camera 304, and in step F619, the digital camera 304 sends a DPP authentication response message to the digital camera 301. In F620, the digital camera 301 sends a DPP authentication confirmation message to the digital camera 304, and in F621, the digital camera 304 sends a DPP setting request message to the digital camera 301. Then, in F622, the digital camera 301 sends a DPP setting response message to the digital camera 304 (Yes in S510 described in FIG. 5, and the process proceeds to S507).

In F623, the digital camera 304 connects to the network 305 created by the digital camera 302 based on the wireless parameters included in the received DPP setting response message.

Upon receipt of a participation closing instruction from the user in F624, the digital camera 301 connects to the network 305 created by the digital camera 302 in F625 and terminates the wireless LAN network formation processing.

Advantageous Effects of the Embodiment

As described above, according to the present embodiment, when the maximum connectable device number of the digital camera itself as the DPP setting device is less than the maximum network participating device number−1, the digital camera 301 determines another DPP participating device (the digital camera 302) as a wireless LAN access point. Then, the network 305 is created by the digital camera 302. That is, the digital camera 301 according to the present embodiment can set an appropriate device as an access point for formation of a network. By setting the digital camera 302 as an access point, the digital cameras 301, 303, and 304 can connect to the network 305, so that the convenience of the user is improved as compared with the case of using the digital camera 301 as an access point.

As described above, according to the present embodiment, the wireless parameters are automatically provided from the DPP setting device to another device so that the appropriate device becomes the access point of the wireless LAN network.

When the maximum connectable device number of the digital camera 301 is three or more, the result of the determination in S506 described in FIG. 5 is No, and thus the digital camera 301 is determined as the access point in S407. That is, when the maximum connectable device number of the digital camera 301 is greater than or equal to the maximum participating device number−1, the digital camera 301 determines the digital camera itself as an access point. In this case, the digital cameras 302 to 304 participate in the network created by the digital camera 301.

(Modifications)

In the above-described embodiment, in S506, when the maximum connectable device number of the digital camera 301 is greater than or equal to the maximum participating device number−1, the digital camera 301 is set as an access point. The above-described embodiment is not seen to be limiting. For example, the digital camera 301 can acquire the maximum connectable device number of each of the other digital cameras 302 to 304, and determine one of the digital cameras 301 to 304 as an access point that has the maximum connectable device number greater than or equal to a predetermined value.

In the above-described embodiment, a digital camera is used as an example of a communication apparatus. In another example, the communication apparatus can be an apparatus such as a printer, a projector, a tablet terminal, a smartphone, or the like that includes a communication function. The above-described embodiment is applicable to such a communication apparatus.

In the above-described embodiment, the maximum number of devices that can participate in the network is four. The maximum participating device number is not limited to four, and can be less than or greater than four. For example, to form a network in which a plurality of digital cameras can share images, the maximum participating device number can be set to ten.

In the above-described embodiment, DPP as the standard prescribed in the Wi-Fi® Alliance is used. However, the above-described embodiment can also be applied to a network formation scheme other than DPP. The above-described embodiment discusses a wireless LAN network conforming to the IEEE 802.11 series standard. However, the above-described embodiment can also be applied to wireless networks that confirm to a different standard.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-070891, filed Apr. 2, 2018, which is hereby incorporated by reference herein in its entirety.

What is claimed is:

1. A communication apparatus comprising:
one or more processors; and
one or more memories including instructions that, when executed by the one or more processors, cause the communication apparatus to:
communicate with another communication apparatus operable as a creating apparatus that creates a wireless network or as a participating apparatus that participates in a wireless network created by a creating apparatus;
determine whether a number of connectable apparatuses when the another communication apparatus operates as the creating apparatus is greater than or equal to a predetermined value;
provide, in a case where it is determined by the determination that the number of connectable apparatuses is greater than or equal to the predetermined value, the another communication apparatus with a communication parameter to be used for operating as the creating apparatus and provide, in a case where it is determined by the determination that the number of connectable apparatuses is less than the predetermined value, the another communication apparatus with a communication parameter to be used for operating as the participating apparatus; and
transmit, in a case where it is determined by the determination that the number of connectable apparatuses is greater than or equal to the predetermined value, an instruction for operating as the creating apparatus to the another communication apparatus.

2. The communication apparatus according to claim 1, wherein
the communication apparatus makes the determination in a case where the number of connectable apparatuses when the communication apparatus operates as the creating apparatus is less than the predetermined value.

3. The communication apparatus according to claim 1, wherein
in a case where the number of connectable apparatuses when the communication apparatus operates as the creating apparatus is greater than or equal to the predetermined value, the communication apparatus provides the another communication apparatus with the communication parameter to be used for operating as the participating apparatus regardless of whether the number of connectable apparatuses when the another communication apparatus operates as the creating apparatus is greater than or equal to the predetermined value.

4. The communication apparatus according to claim 1, wherein
the predetermined value is a value determined based on the number of connectable apparatuses under predetermined conditions.

5. The communication apparatus according to claim 1, wherein
the predetermined value is a value determined based on an application implementable by the communication apparatus.

6. The communication apparatus according to claim 1, wherein the execution of the instructions further causes the communication apparatus to:
accept an input of a value, wherein
the predetermined value is determined based on the acceptable value.

7. The communication apparatus according to claim 1, wherein
the predetermined value is a value obtained by subtracting 1 from the number of connectable apparatuses.

8. The communication apparatus according to claim 1, wherein
the wireless network is a wireless LAN network conforming to a IEEE 802.11 standard.

9. The communication apparatus according to claim 1, wherein
the communication apparatus and the another communication apparatus are imaging apparatuses having a communication function.

10. The communication apparatus according to claim 1, wherein the execution of the instructions further causes the communication apparatus to: transmit the communication parameter necessary for forming the wireless network to the another communication apparatus based on a Device Provisioning Protocol standard.

11. A control method of a communication apparatus, the method comprising:
- communicating with another communication apparatus operable as a creating apparatus that creates a wireless network or as a participating apparatus that participates in a wireless network created by a creating apparatus;
- determining, whether a number of connectable apparatuses when the another communication apparatus operates as the creating apparatus is greater than or equal to a predetermined value;
- providing, in a case where it is determined that the number of connectable apparatuses is greater than or equal to the predetermined value, the another communication apparatus with a communication parameter to be used for operating as the creating apparatus and providing, in a case where it is determined that the number of connectable apparatuses is less than the predetermined value, the another communication apparatus with a communication parameter to be used for operating as the participating apparatus; and
- transmitting, in a case where it is determined that the number of connectable apparatuses is greater than or equal to the predetermined value, an instruction for operating as the creating apparatus to the another communication apparatus.

12. A non-transitory computer readable storage medium storing a program for causing a communication apparatus to execute a method, the method comprising:
- communicating with another communication apparatus operable as a creating apparatus that creates a wireless network or as a participating apparatus that participates in a wireless network created by a creating apparatus;
- determining, whether a number of connectable apparatuses when the another communication apparatus operates as the creating apparatus is greater than or equal to a predetermined value;
- providing, in a case where it is determined that the number of connectable apparatuses is greater than or equal to the predetermined value, the another communication apparatus with a communication parameter to be used for operating as the creating apparatus and providing, in a case where it is determined that the number of connectable apparatuses is less than the predetermined value, the another communication apparatus with a communication parameter to be used for operating as the participating apparatus; and
- transmitting, in a case where it is determined that the number of connectable apparatuses is greater than or equal to the predetermined value, an instruction for operating as the creating apparatus to the another communication apparatus.

13. The communication apparatus according to claim 1, wherein
- the communication apparatus transmits, in a case where it is determined by the determination that the number of connectable apparatuses is greater than or equal to the predetermined value, a signal including the communication parameter to be used for operating as the creating apparatus and the instruction for operating as the creating apparatus to the another communication apparatus.

* * * * *